Jan. 14, 1969     O. C. ECKEL     3,421,273
ACOUSTICAL MEMBERS
Filed July 23, 1962     Sheet 1 of 3
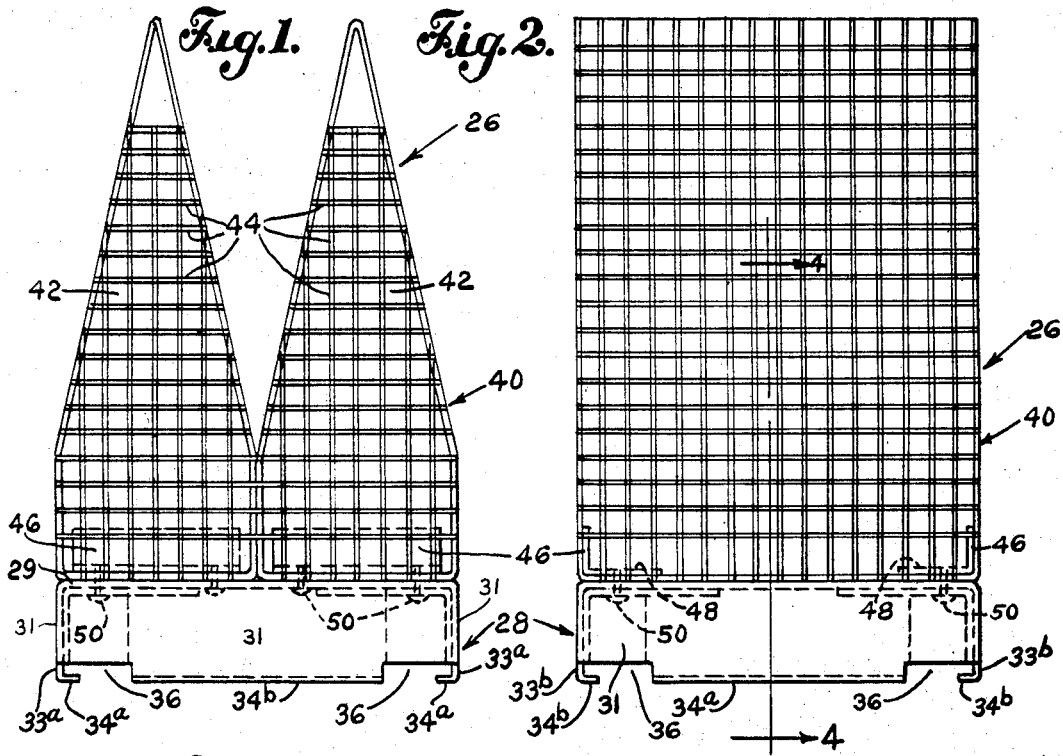
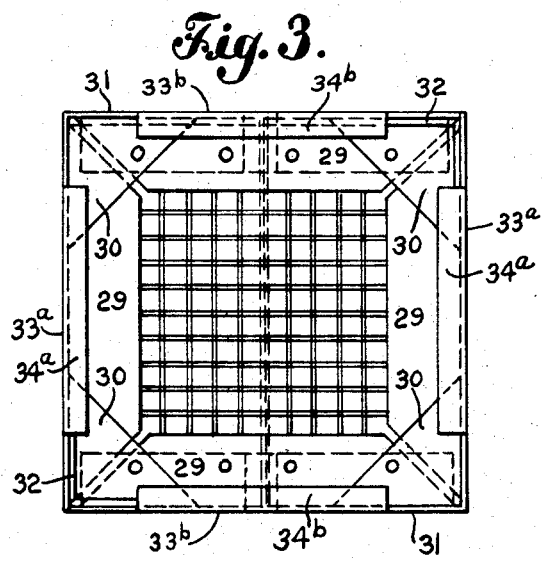
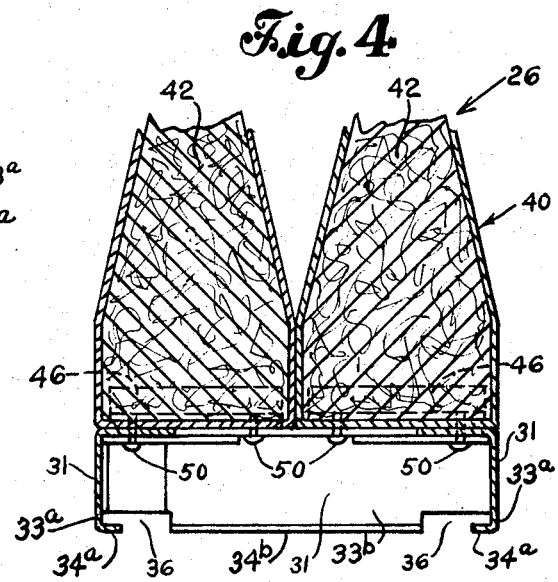
INVENTOR
Oliver C. Eckel
BY Harold E. Cole
Attorney

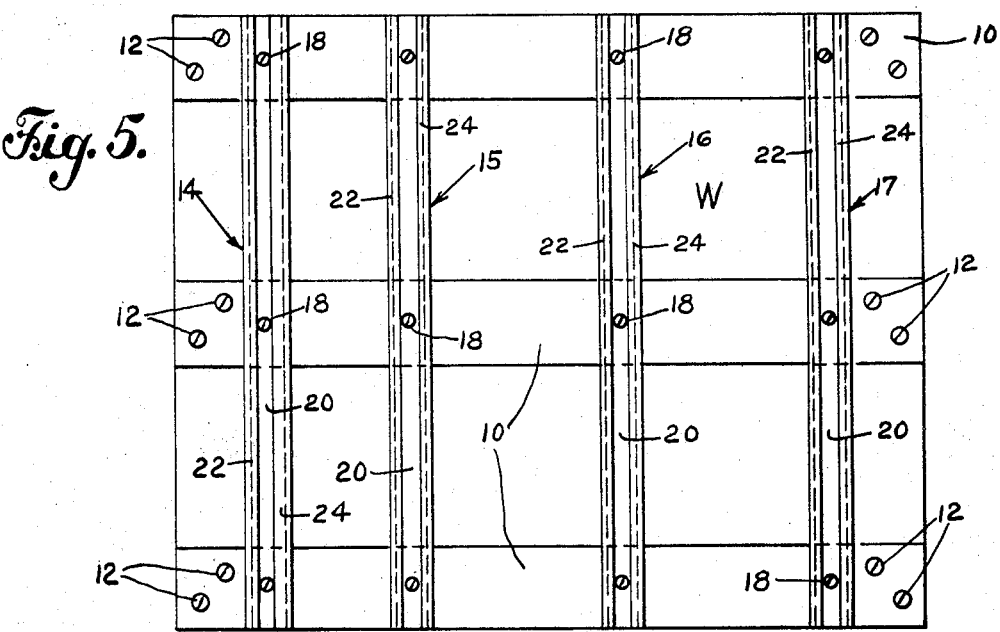
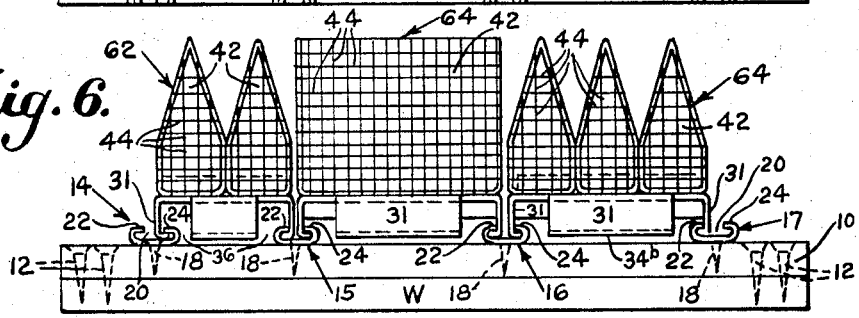
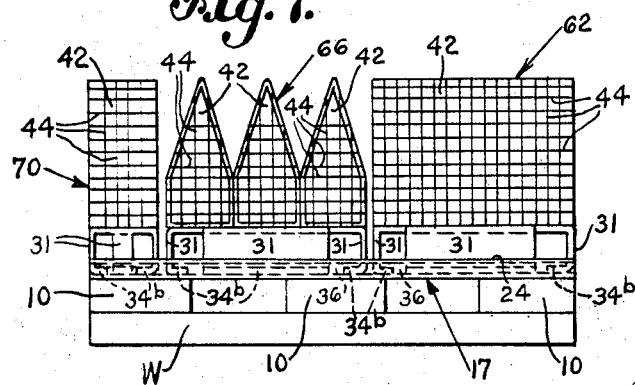

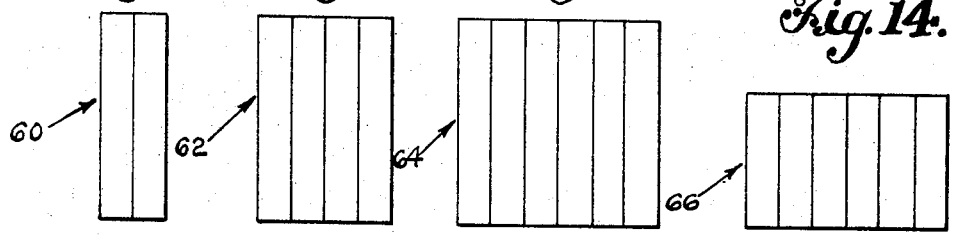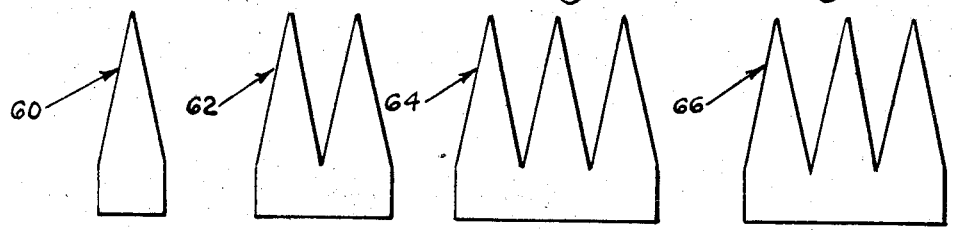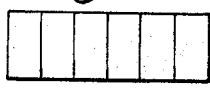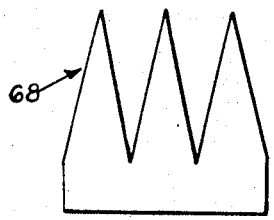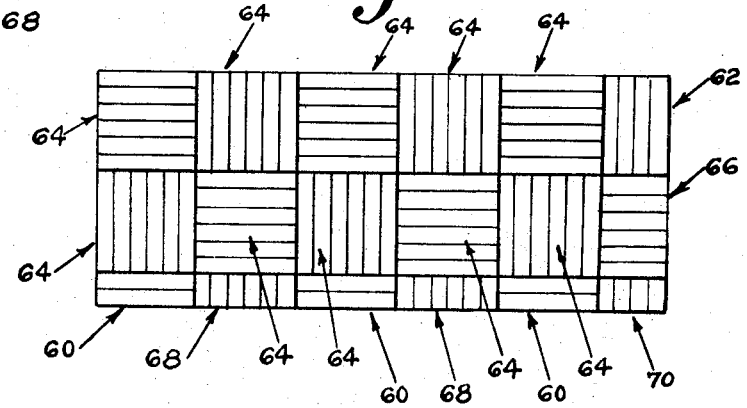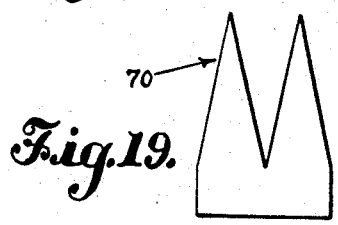

United States Patent Office 3,421,273
Patented Jan. 14, 1969

3,421,273
ACOUSTICAL MEMBERS
Oliver C. Eckel, Carlisle, Mass.
(155 Fawcett St., Cambridge, Mass. 02138)
Filed July 23, 1962, Ser. No. 211,606
The portion of the term of the patent subsequent to
Apr. 23, 1980, has been disclaimed
U.S. Cl. 52—145       2 Claims
Int. Cl. E04b 1/82; G10k 11/04

This invention relates to acoustical members including an assembly of them.

Reference is made to my patent application Ser. No. 85,280, filing date Jan. 27, 1961, now Patent No. 3,086,325.

One object of my invention is to provide acoustical devices of different sizes, which have joiners whereby the devices can be mounted on a support by sliding them into place, and likewise removing them. The supports are ordinarily attached to a wall, ceiling or floor.

In installing my devices on a wall or the like, oftentimes there is only a relatively small space to fill in at a side, or at a top or bottom, hence another object of my invention is to provide such devices in various sizes that are equipped with joiners whereby the devices can be slid into whatever size of space is available to thereby completely fill the available space with acoustical members.

A further object is to equip said joiners with sufficient flanges so the sound absorbing members attached to said devices can be positioned at right angles to each other.

The forgoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

FIG. 1 is a side elevational view of a sound absorbing device forming part of my assembly.

FIG. 2 is a side elevational view of said device taken at a right angle to the view shown in FIG. 1.

FIG. 3 is an inner bottom elevational view of said device.

FIG. 4 is a sectional view taken on the line 4—4 of FIG. 3, the sound absorbing devices being shown broken away.

FIG. 5 is an elevational view on a reduced scale of a support on which said devices are mounted in position of use.

FIG. 6 is an elevational view showing three sound absorbing devices in two different sizes in mounted position on a said support to form part of an assembly.

FIG. 7 is an elevational view taken at a right angle to the view shown in said FIG. 6, and which shows three different sound absorbing devices, two of which differ from those shown in said FIG. 6.

FIG. 8 is a schematic top plan view of a sound absorping member.

FIG. 9 is an elevational view of said member shown in said FIG. 8.

FIG. 10 is a schematic top plan view of another sound absorbing member.

FIG. 11 is an elevational view of said member shown in said FIG. 10.

FIG. 12 is a schematic top plan view of another sound absorbing member.

FIG. 13 is an elevational view of said member shown in said FIG. 12.

FIG. 14 is a schematic top plan view of another sound absorbing member.

FIG. 15 is an elevational view of said member shown in said FIG. 14.

FIG. 16 is a schematic top plan view of another sound absorbing member.

FIG. 17 is an elevational view of said member shown in said FIG. 16.

FIG. 18 is a schematic top plan view of another sound absorbing member.

FIG. 19 is an elevational view of said member shown in said FIG. 18.

FIG. 20 is a schematic plan view showing the sound absorbing members illustrated in FIGS. 8–19 inclusive in an assembled position as they would appear when extending outwardly from a wall.

As illustrated, my acoustical members are shown in an assembly that has a support which is formed, as shown, by a plurality of straps 10 that are spaced apart and screwed as at 12 to a wall, floor or ceiling, for instance.

Tracks 14, 15, 16 and 17 are screwed as at 18 to, and form part of, said straps 10, only four tracks being shown for illustration. Each track has a main body, shown as a flat portion 20 from which extends inwardly a flange 22, and laterally opposite and spaced from the latter is another inturned flange 24, which flanges also serve as retainers as later explained. Tracks 15, 16 and 17 are shown spaced an equal distance apart from each other, whereas the space between tracks 14 and 15 is considerably less than the other spaces for a purpose later described.

A sound absorbing device 26 or other article, shown in detail in said FIGS. 1, 2, 3 and 4, embodies a joiner 28 which is rectangular in plan view. Said joiner has attaching portions 29 reinforced by corner pieces 30 and from which four sides 31 extend outwardly and which are reinforced by two angle pieces 32. Each said side 31 has an extension of reduced width extending outwardly and a connecting flange that extends therefrom laterally inward and is of lesser length than the side 31 it extends from. Two of said extensions are given the numeral 33a and are laterally opposite each other, as are the other two which have the numeral 33b. Two of said connecting flanges that are oppositely disposed, are given the numeral 34a, and the other two that are oppositely disposed are given the numeral 34b. There are cut-outs 36 at opposite ends of each of said flanges 34a and 34b to permit either pair of said joiner flanges, 34a or 34b, to slide into a connection with track retainer flanges 22 and 24 on two different tracks.

Attached to each said joiner 28 is one or more structures 40 such as the sound absorbing members shown in FIGS. 1 and 2, and 62, 64, 66 and 70 shown on FIGS. 6 and 7, each having a main body of glass wool 42 or other material, herein shown, having wedge-shaped outer portions, and covered by an open-mesh member 44. Each said sound absorbing member has, near its inner end, an angle connector having a relatively short outer portion 46 extending along a side and a relatively long inner or attaching portion 48 at a right angle to the latter. Screws 50 attach said inner portion 48 to said joiner 28 thus uniting the said sound absorbing members or structures 40 and joiner 28 so they can be handled as a unitary device.

In assembling my invention on a wall, one of a pair of said connecting flanges, either 34a or 34b, is retained by a said retainer flange 22 of one said track 16, for instance, while the other said flange of the pair—either 34a or 34b—is retained by a said retainer flange 24 of another said track 17, for instance. Thus the two said tracks 16 and 17 each provide a retainer flange for the pair of connector flanges 34a of one said device 26 and also for the pair of connector flanges 34b of another said device 26 above or below the latter device, when the two devices are installed on the same two tracks 16 and 17. In this arrangement the outer or dihedral edges of said sound absorbing members 40 of one said device are disposed at right angles to those of the other said device. This position is illustrated in FIGS. 1 and 2 of the drawings, for instance.

Also in the assembly, it is desirable to position said devices 26 laterally adjoining each other so that the outer or dihedral edges of one said device extend at right angles to said edges of the other device. In this event one of said flanges 34a of one said device and one of said flanges 34b of another said device will be on the same track. Thus one said flange 34b is retained by a said retainer flange 22 and another said flange 34a by a retainer flange 24.

While said devices 26 shown in said FIG. 2 are substantially square in plan view, as shown in said FIG. 3, hence can be mounted on said tracks 15 and 16, or 16 and 17 it is sometimes necessary, as when completing a side of a wall, or a top or a bottom thereof, to use narrower devices. The absorbing members for such narrower devices are given numerals 60, 62, 66, 68 and 70, for instance, and are illustrated in FIGS. 8–11, and 14–19, inclusive. The latter members are oblong in bottom plan view and are illustrated, in use, by a diagrammatic assembly thereof in said FIG. 20 together with absorbing members that are square in plan view, which latter are given the numeral 64 in said assembly, being the same shape as the sound absorbing members 40.

These oblong members 60, 62, 66, 68 and 70 are similar in construction to said members 40, hence the joiners therefor are of the same construction as shown in FIGS. 1–4 inclusive, hence the parts are identified by the same numerals, as in FIGS. 6 and 7, for instance. The member 64 shown in said FIGS. 12 and 13 is square in plan view, hence is similar to said member 40 and so appears in the diagrammatic assembly shown in said FIG. 20.

What I claim is:

1. An assembly of acoustical members comprising a support having three tracks spaced apart different distances whereby there are relatively narrow and wide spaces between them, each said track having two inwardly extending retainer flanges spaced laterally apart, two sound absorbing devices each embodying a joiner one of which is of substantially oblong shape and the other is of substantially square shape, each said joiner having four right-angled side portions and four connector flanges extending angularly inward from said side portions, any two of said connector flanges of said square-shaped joiner that are oppositely disposed being of such size that they are receivable on, and overlapped by one each of the said retainer flanges of the two of said widely spaced tracks, and are slidable along said latter two retainer flanges, and two of said connector flanges of said oblong-shaped joiner that are oppositely disposed being of such size that they are receivable on and overlapped by said retainer flanges of the two of said narrowly spaced tracks and are slidable along said latter two retainer flanges.

2. An assembly of acoustical members comprising a support having three tracks spaced apart different distances whereby there are relatively narrow and wide spaces between them, each said track having two inwardly extending retainer flanges spaced laterally apart, two sound absorbing devices each embodying a joiner one of which is of substantially oblong shape and the other is of substantially square shape, the latter said joiner having four right-angled side portions and four connector flanges extending angularly inward from said side portions, any two of said connector flanges of said square-shaped joiner that are oppositely disposed being of such size that they are receivable on, and overlapped by one each of the said retainer flanges of the two of said widely spaced tracks, and said oblong-shaped joiner having two side portions extending parallel and spaced from each other and each having a connector flange extending angularly inward from said side portions and being of such size that they are receivable on, and overlapped by said retainer flanges of the two of said narrowly spaced tracks and are slidable along said latter two retainer flanges.

References Cited

UNITED STATES PATENTS 2,101,568 12/1937 Woodbury _____ 181—33.1
3,086,325 4/1963 Eckel _____ 50—101

FRANK L. ABBOTT, *Primary Examiner.*

A. G. PERHAM, *Assistant Examiner.*

U.S. Cl. X.R.
52—497; 181—33